United States Patent
Lee et al.

(10) Patent No.: US 9,212,684 B2
(45) Date of Patent: Dec. 15, 2015

(54) RIVET NUT UNIT

(71) Applicant: SUNGWOO HITECH CO., LTD., Busan (KR)

(72) Inventors: Mun Yong Lee, Busan (KR); Deok Hyun Kim, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 0 days.

(21) Appl. No.: 14/140,688

(22) Filed: Dec. 26, 2013

(65) Prior Publication Data

US 2015/0043995 A1    Feb. 12, 2015

(30) Foreign Application Priority Data

Aug. 9, 2013    (KR) .......................... 10-2013-0094665

(51) Int. Cl.
*F16B 13/04*    (2006.01)
*F16B 37/06*    (2006.01)

(52) U.S. Cl.
CPC .................................. *F16B 37/067* (2013.01)

(58) Field of Classification Search
CPC ........ F16B 41/002; F16B 19/04; F16B 13/04; F16B 37/067
USPC ............................................................ 411/29
See application file for complete search history.

(56) References Cited

U.S. PATENT DOCUMENTS

| | | | |
|---|---|---|---|
| 3,750,518 A | 8/1973 | Rayburn | |
| 6,299,642 B1 * | 10/2001 | Chan | ............................... 411/55 |
| 8,206,071 B1 * | 6/2012 | Johnson | ........................ 411/383 |
| 8,721,241 B2 * | 5/2014 | Jokisch | ........................... 411/29 |
| 2003/0190211 A1 * | 10/2003 | Bodin | ............................. 411/29 |
| 2004/0247412 A1 | 12/2004 | Reck | |

FOREIGN PATENT DOCUMENTS

| | | |
|---|---|---|
| JP | 05-157108 | 6/1993 |
| KR | 10-2009-0045946 | 5/2009 |

* cited by examiner

*Primary Examiner* — Roberta Delisle
(74) *Attorney, Agent, or Firm* — Lex IP Meister, PLLC

(57) ABSTRACT

Disclosed is a rivet nut unit. The rivet nut unit may comprise a rivet nut including a flange of which a lower surface is supported by a upper surface of a plate while riveting the plate by a riveter, a body part of which the inside of a lower part is worked to have screw threads and which is integrally formed in a cylindrical shape with a lower portion of the flange, and a hole-making head which is disengageably located on a lower end of the body part to rotate together with the rivet nut and bore an insertion hole in the plate while the riveter rotates in order to insert the body part into the plate.

10 Claims, 8 Drawing Sheets

RIVET NUT UNIT

CROSS-REFERENCE TO RELATED APPLICATION

The present application claims priority to Korean Patent Application No. 10-2013-0094665 filed on Aug. 9, 2013, the entire contents of which is incorporated herein for all purposes by this reference.

BACKGROUND OF THE INVENTION

1. Field of the Invention

The present invention relates to a rivet nut unit, and more particularly, to a rivet nut unit that reduces processes and improves workability by making it possible to bore a hole in a plate and fix a rivet nut thereto simultaneously.

2. Description of Related Art

In general, a rivet is for fastening at least two plates of metal such as shape steels, mechanical devices, or various workpieces, etc.

Worker makes an insertion hole in the plate which needs connecting, inserts a rivet, and fixes it thereto by using a hammer or other mechanical devices, in other words, forming a fixing head. These working processes are complicated and defect rate considerably changes with skill level of the worker because the works are done manually.

Thus, various forms of rivets are being developed nowadays to perform riveting works easily and efficiently. Among them, a rivet nut is representative.

FIG. 1A, FIG. 1B, FIG. 1C and FIG. 1D are drawings which shows the processes of installing a rivet nut in a conventional way.

Referring to FIG. 1A, FIG. 1B, FIG. 1C and FIG. 1D, a conventional rivet nut 1 comprises a flange 10 which is in contact with the upper surface of a plate 5 and a body part 20 which is integrally formed in a cylindrical shape under the flange 10 and of which the interior circumference of the lower part is worked to have screw threads.

In order to install the rivet nut 1 into a plate 5, firstly, the plate 5 needs to be perforated in the upper surface of the plate 5 by using a drill 3 to have an insertion hole 7 (FIG. 1A). Then, the rivet nut 1 is inserted into the insertion hole 7 with a riveter 30 engaged in the screw threads of the body part 20 of the rivet nut 1 (FIG. 1B).

In this state, if worker, machine or robot, etc. pull the riveter 30, the body part 20 of the rivet nut 1 is compressed in the pulling direction.

At this moment, the rivet nut 1 is fixedly installed into the plate 5 by the part of which the body part 20 is in contact with the plate 5 being expanded with the plate 5 lying between the flange 10 and the body part 20 (FIG. 1C).

Then, the riveter 30 is disengaged from the screw threads of the body part 20 and installing the rivet nut 1 into the plate 5 is completed (FIG. 1D).

As mentioned above, worker must necessarily bore an insertion hole 7 in a plate 5 by using a drill 3, before riveting in the process of riveting the plate 5 by using a rivet nut 1.

In other words, at least one plate 5 can be conveniently riveted by using a rivet nut 1, but there happen the problems of working processes increasing and workability deteriorating because the work of making an insertion hole 7 must separately be fulfilled.

Also, the conventional way of riveting contains the problem of the increase of tool purchasing cost with a drill 3 needed necessarily to bore an insertion hole 7 in a plate 5 and the reduction of productivity with the increase of time to install the rivet nut 1.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rivet nut unit having advantages of improving workability by making it possible simultaneously to bore an insertion hole in a plate and fix a rivet nut thereto with the rivet nut inserted into the insertion hole and increasing productivity by reducing the work processes and the time to install.

In an aspect of the present invention, The rivet nut unit may include a rivet nut including a flange of which a lower surface is supported by a upper surface of a plate while riveting the plate by a riveter, a body part of which the inside of a lower part is worked to have screw threads and which is integrally formed in a cylindrical shape with a lower portion of the flange, and a hole-making head which is disengageably located on a lower end of the body part to rotate together with the rivet nut and bore an insertion hole in the plate while the riveter rotates in order to insert the body part into the plate The flange may have at least one locking groove formed on an external circumference thereof in order for the rivet nut to rotate together with the riveter while the riveter rotates in a state of being engaged with the flange.

One locking groove may be spaced apart from another locking groove circumferentially and the two locking groove form a predetermined angle therebetween.

The predetermined angle may be about 120 degrees.

The hole-making head may have at least one fitting protrusion formed at the upper surface thereof connected with the body part.

One fitting protrusion may be spaced apart from another fitting protrusion circumferentially and the two fitting protrusion form a predetermined angle therebetween.

The body part may have at least one fitting groove which is formed at the lower end of the body part and adapted to fix the hole-making head to the body part while being engaged to the fitting protrusion.

One fitting groove may be spaced apart from another fitting groove circumferentially and the two fitting groove form a predetermined angle therebetween.

The predetermined angle may be about 120 degrees.

The riveter may include a disengaging rod mounted at the center of the inside of the riveter, and the disengaging rod is movable up and down in order for the hole-making head to be disengaged from the body part when the body part inserted into the insertion hole is compressed or thereafter.

Figure 1A:
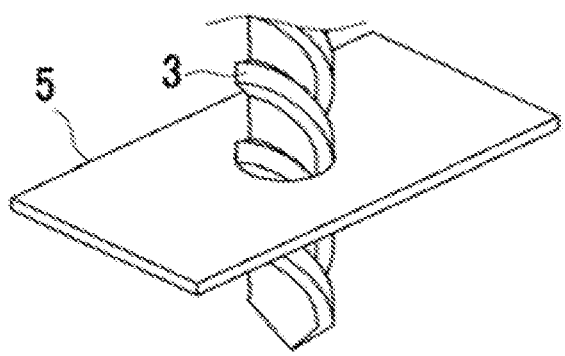
FIG. 1A, FIG. 1B, FIG. 1C and FIG. 1D are drawings which shows the processes of installing a rivet nut in a conventional way.
Figure 1B:
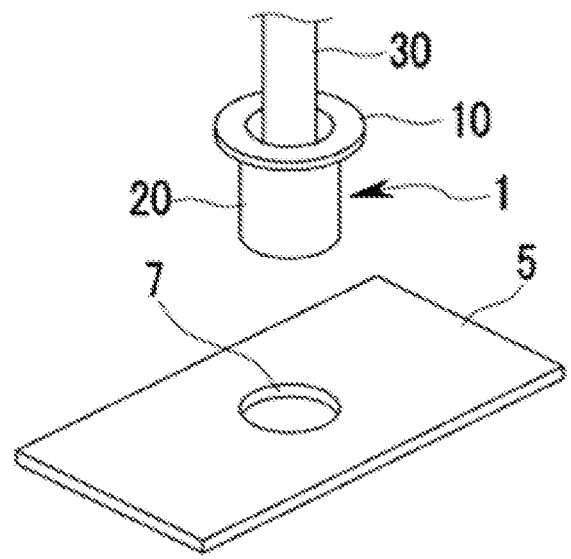
Figure 1C:
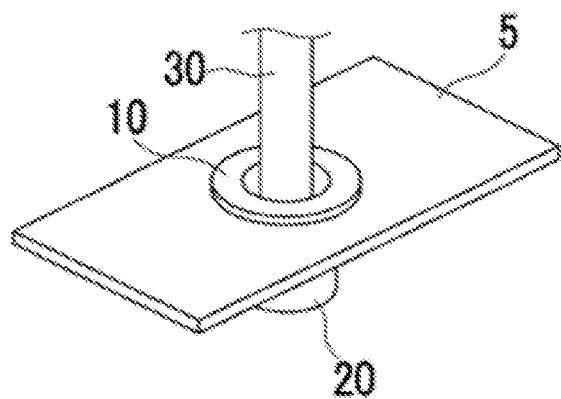
Figure 1D:
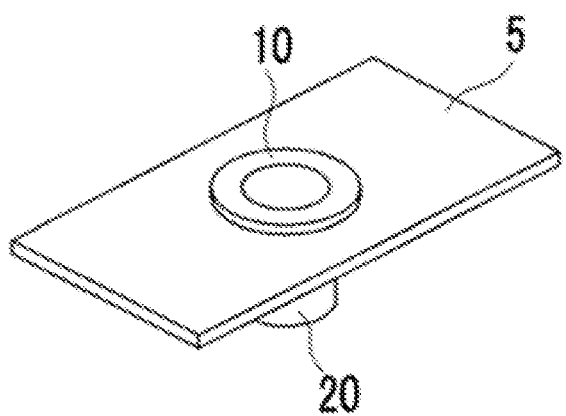

100: rivet nut unit
101: plate
103: riveter
105: locking protrusion
107: disengaging rod
110: rivet nut
111: flange
113: body part
115: locking groove
117: fitting groove
120: hole-making head
121: fitting protrusion It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

An exemplary embodiment of the present invention will hereinafter be described in detail with reference to the accompanying drawings.

Prior to this, configurations illustrated in the embodiments and the drawings described in the present specification are only the most preferred embodiment of the present invention and do not represent all of the technical spirit of the present invention, and thus it is to be understood that various modified examples, which may replace the configurations, are possible when filing the present application.

In addition, unless explicitly described to the contrary, the word "comprise" and variations such as "comprises" or "comprising" will be understood to imply the inclusion of stated elements but not the exclusion of any other elements.

Further, terms such as "-unit", "-means", "-part", "-member", etc. mean units of comprehensive configurations that performs at least one function or operation.

Figure 2:
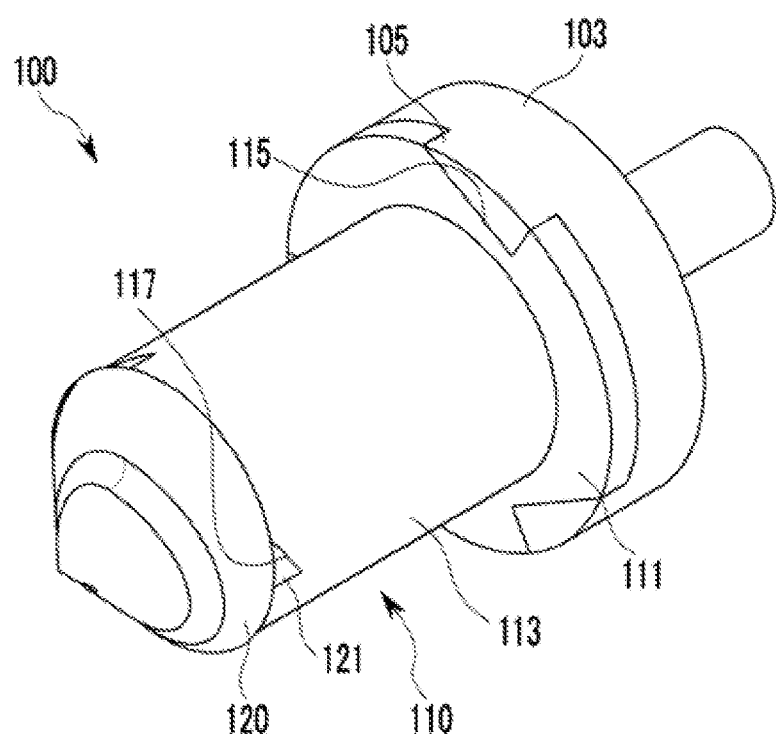
FIG. 2 is a perspective view of the rivet nut unit according to an exemplary embodiment of the present invention.
Figure 3:
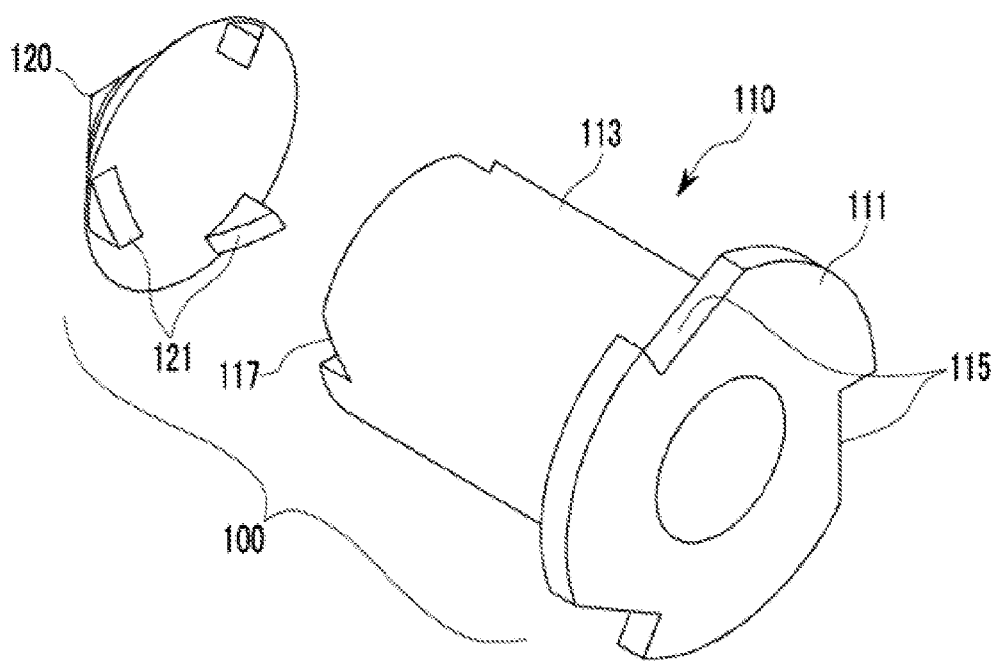
FIG. 3 and FIG. 4 are exploded perspective views of the rivet nut unit according to an exemplary embodiment of the present invention.
Figure 4:
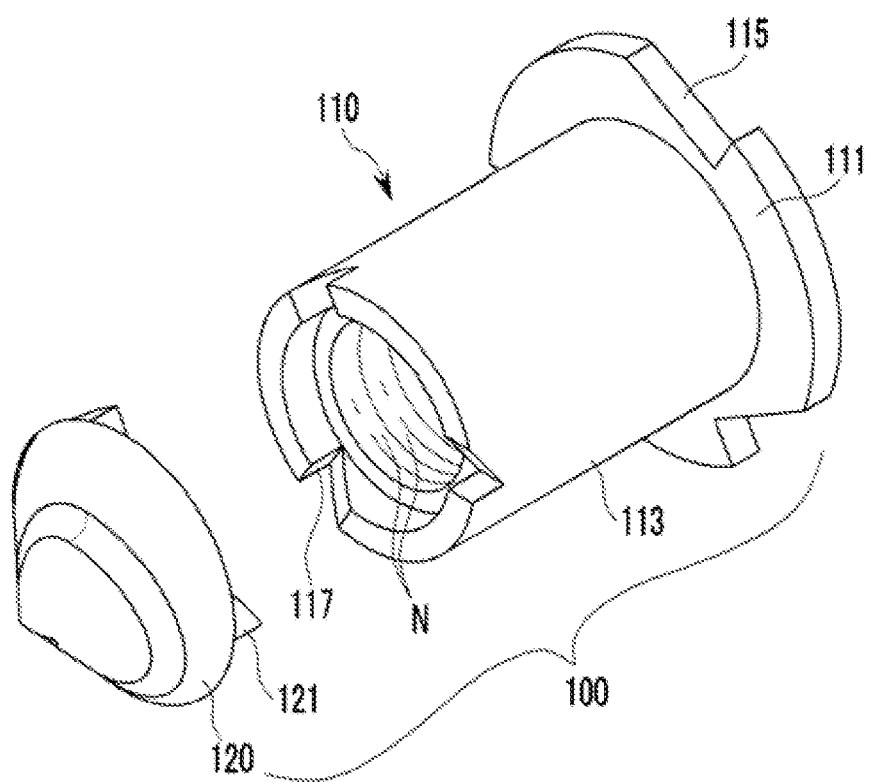

FIG. 2 is a perspective view of the rivet nut unit according to an exemplary embodiment of the present invention. FIG. 3 and FIG. 4 are exploded perspective views of the rivet nut unit according to an exemplary embodiment of the present invention.

Referring to the drawings, the rivet nut unit 100 according to an exemplary embodiment of the present invention has a structure which improves workability by making it possible simultaneously to bore an insertion hole 102 in a plate 101 and fix a rivet nut 110 thereto by riveting with the rivet nut 110 just inserted into the insertion hole and increases productivity by reducing the work processes and the time to install.

For this, the rivet nut unit 100 according to an exemplary embodiment of the present invention includes a rivet nut 110 and a hole-making head 120 as illustrated in FIGS. 2 to 4. To explain more specifically about each component, it is as in the following.

Firstly, the rivet nut 110 includes a flange 111 of which a lower surface is supported by a upper surface of a plate 101 while riveting the plate 101 by a riveter 103, a body part 113 of which the inside of the lower part is worked to have screw threads N and which is integrally formed in a cylindrical shape with a lower portion of the flange 111.

Herein, the flange 111 may have at least one locking groove 115 formed in circumferential surface in order for the rivet nut 110 to rotate together with the riveter 103 while the riveter 103 rotates with the flange 111 engaged with the riveter 103.

Each locking groove 115 may be spaced apart from each other at an angle set in the direction of the circumference of the flange 111. In the present exemplary embodiment the angle set in circumferential direction is 120 degrees.

According to this, three locking grooves 115 are formed and each one is spaced apart from each other at the angle of 120 degrees in the direction of the circumference of the flange 111. If the riveter 103 rotates in the forward direction, the rivet nut 110 rotates together with the riveter 103 by being locked. If the riveter 103 rotates in the reverse direction, the riveter 103 moves up along the screw threads N and the rivet nut 110 is disengaged from the riveter 103.

Herein, the riveter 103 may have at least one locking protrusion which corresponds to the locking groove(s) 115 and may be integrally formed under the riveter 103. The riveter 103 is engaged with the locking groove(s) 115 by the locking protrusion(s) 105.

In addition, the hole-making head 120 is a kind of a drill for making a hole and is disengageably located on a lower end of the body part 113 to rotate together with the rivet nut 110 and bore an insertion hole 102 in the plate 101 while the riveter 103 rotates to insert the body part 113 into the plate 101.

Herein, the hole-making head 120 may have at least one fitting protrusion 121 which is formed at the upper surface of the hole-making head 120 which is connected with the body part 113.

Each fitting protrusion 121 may be formed on the upper surface of the hole-making head 120 and spaced apart from each other at an angle set in circumferential direction. In the present exemplary embodiment, the angle set in circumferential direction is 120 degrees, so three fitting protrusions 121 can be formed as explained above.

In the present exemplary embodiment, the body part 113 has at least one fitting groove 117 which is formed at the lower end of the body part 113 and corresponds to the fitting protrusion 121, for the hole-making head 120 to be fixed to the body part 113 with the fitting protrusion 121 engaged into the fitting groove 117.

Each fitting groove 117 may be formed under the lower end of the body part 113 and spaced apart from each other at an angle set in circumferential direction. In the present exemplary embodiment, the angle set in circumferential direction can be 120 degrees.

According to this, three fitting grooves 117 are formed in the lower end of the body part 113 and each one is spaced apart from each other at the angle of 120 degrees in the direction of the circumference of the body part 113. If the riveter 103 rotates in the forward direction, the fitting protrusions 121 can keep being engaged correspondingly with the fitting grooves 117 and the hole-making head 120 can rotate together with the rivet nut 110.

Meanwhile, the riveter 103 may be equipped with a disengaging rod 107 which can be moved up and down in the center of the inside of the riveter 103 for the hole-making head 120 to be disengaged from the body part 113 with the riveter 103 engaged with the screw threads N when the body part 113 inserted into the insertion hole 102 is compressed or thereafter.

That is, the disengaging rod 107 can disengage the hole-making head 120 which is engaged with the fitting groove 117 through the fitting protrusion 121 from the body part 113 by being moved down while the riveter 103 engaged with the screw threads N is pulled upwards and the body part 113 is compressed onto the plate 101.

The operation and action of the rivet nut unit 100 according to an exemplary embodiment of the present invention will hereinafter be described in detail.

FIG. 5A, FIG. 5B, FIG. 5C and FIG. 5D are is step-by-step use state diagrams illustrating the use states of the rivet nut unit according to an exemplary embodiment of the present invention.

Figure 5A:
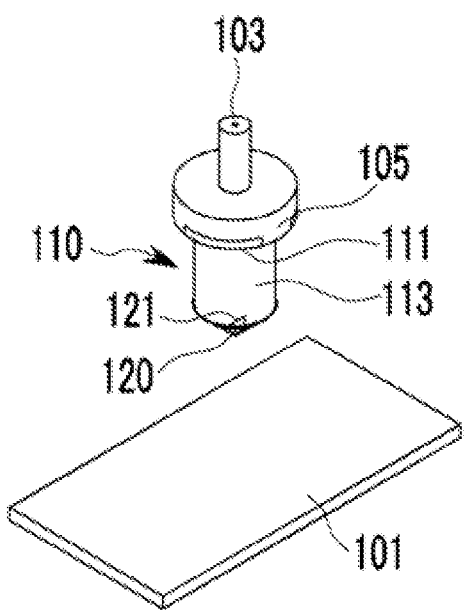
FIG. 5A, FIG. 5B, FIG. 5C and FIG. 5D are step-by-step use state diagrams illustrating the use states of the rivet nut unit according to an exemplary embodiment of the present invention.

As illustrated in FIG. 5A, the hole-making head 120 is engaged with the body part 113 of the rivet nut 110 and the riveter 103 is engaged with the upper part of the flange 111. After that, the rivet nut unit 100 is moved toward the upper part of the working place of the plate 101.

In this case, the hole-making head 120 is engaged with the body part 113 by the fitting protrusion 121 being inserted into the fitting groove 117 and the riveter 103 is engaged with the flange 111 by the locking protrusion 105 being engaged with the locking groove 115 with the front end of the riveter 103 engaged with the screw threads N.

In this state, if the riveter 103 rotates in the forward direction, the rivet nut unit 100 rotates likewise and the hole-making head 120 rotates in the same direction together with the body part 113. Then, the hole-making head 120 is moved down toward the plate 101.

Figure 5B:
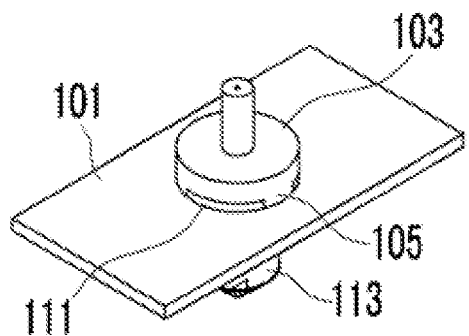

As a result, the hole-making head 120 bores the plate 101 to make an insertion hole 102 and the body part 113 is inserted into the insertion hole 102 by the riveter 103 rotating and descending simultaneously, as illustrated in FIG. 5B.

When the body part 113 is fully inserted into the insertion hole 102 and the lower surface of the flange 111 is in contact with the upper surface of the plate 101, the body part 113 is pulled upwards by the riveter 103 engaged with the screw threads N and compressed with the plate 101 lying between the flange 111 and the body part 113.

Figure 5C:
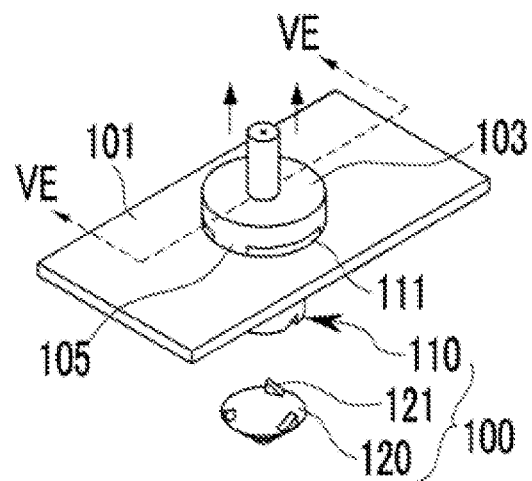
Figure 5D:
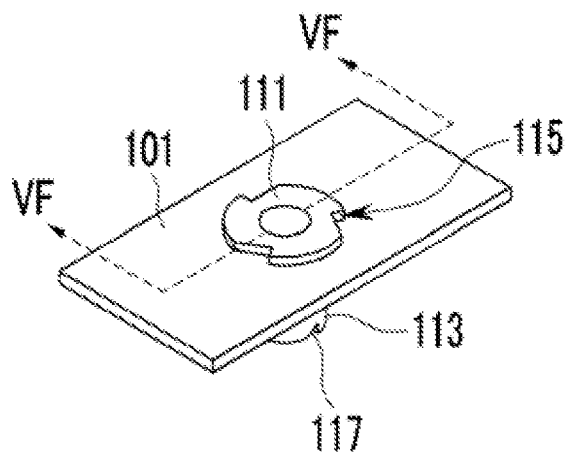
Figure 5E:
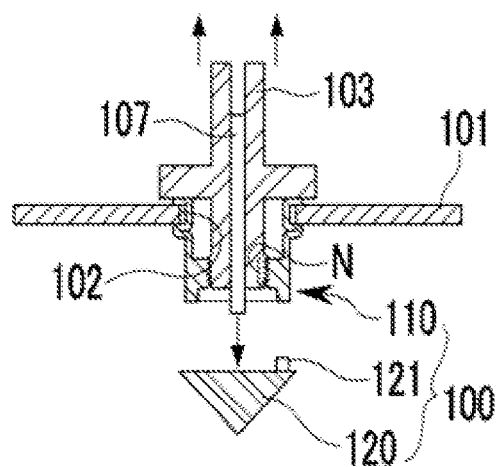
FIG. 5E is a cross-sectional view showing the cross-section along VE-VE line of FIG. 5C.

In this case, as illustrated in FIG. 5C and FIG. 5E, the disengaging rod 107 of the riveter 103 may be ejected from the front end of the riveter 103 and disengage the hole-making head 120 from the body part 113, while the riveter 103 is pulled and moved upwards.

Figure 5F:
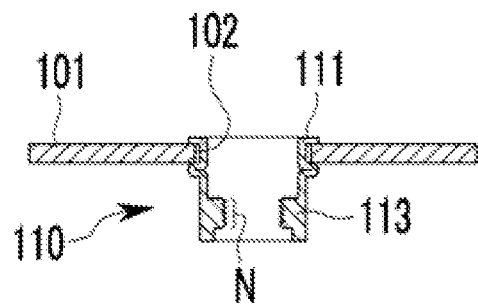
FIG. 5F is a cross-sectional view showing the cross-section along VF-VF line of FIG. 5D.

Then, if riveting is finished with the plate 101 lying between the flange 111 and the body part 113 by the part of which the body part 113 is in contact with the plate 101 being expanded by the compression, the riveter 103 is disengaged from the rivet nut 110 by the riveter 103 being rotated in the reverse direction, as illustrated in FIG. 5D and FIG. 5F. At this moment, the locking protrusion 105 disengages from the locking groove 115 and the front end of the riveter 103 disengages from the screw threads N simultaneously.

Through these processes, the rivet nut 110 is riveted into the plate 101.

Accordingly, if the rivet nut unit 100 according to an exemplary embodiment of the present invention is applied as illustrated above, workability can be improved because riveting is easily performed by boring an insertion hole 102, inserting a rivet nut 110, and fixing it simultaneously. The improvement is achieved by comprising the hole-making head 120 working an insertion hole 102 into the plate 101.

In addition, the conventional process of making a hole can be eliminated and additional tools like a drill, etc. necessarily needed in the process can be omitted. So, reducing cost and increasing productivity by reducing the work processes and the time to install can be achieved.

Further, worker can conveniently perform riveting through manual work even when an object difficult to move or just a small quantity of work needs to be done.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A rivet nut unit, comprising:
   a riveter which is a tool for riveting;
   a rivet nut including a flange of which a lower surface is supported by a upper surface of a plate while riveting the plate by the riveter and a body part of which the inside of a lower part is worked to have screw threads and which is integrally formed in a cylindrical shape with a lower portion of the flange; and
   a hole-making head which is disengageably located on a lower end of the body part to rotate together with the rivet nut and bore an insertion hole in the plate while the riveter rotates in order to insert the body part into the plate,
   wherein the riveter includes a disengaging rod mounted at the center of the inside of the riveter, and the disengaging rod is movable up and down in order for the hole-making head to be disengaged from the body part when the body part inserted into the insertion hole is compressed or thereafter.

2. The rivet nut unit of claim 1, wherein the flange has at least one locking groove formed on an external circumference thereof in order for the rivet nut to rotate together with the riveter while the riveter rotates in a state of being engaged with the flange.

3. The rivet nut unit of claim 2, wherein the at least one locking groove comprises two locking grooves circumferentially spaced apart from each other and the two locking grooves form a predetermined angle therebetween.

4. The rivet nut unit of claim 3, wherein the predetermined angle is about 120 degrees.

5. The rivet nut unit of claim 1, wherein the hole-making head has at least one fitting protrusion formed at the upper surface thereof connected with the body part.

6. The rivet nut unit of claim 5, wherein the at least one fitting protrusion comprises two fitting protrusions circumferentially spaced apart from each other and the two fitting protrusions form a predetermined angle therebetween.

7. The rivet nut unit of claim 6, wherein the predetermined angle is about 120 degrees.

8. The rivet nut unit of claim 6, wherein the body part has at least one fitting groove which is formed at the lower end of the body part and adapted to fix the hole-making head to the body part while being engaged to the at least one fitting protrusion.

9. The rivet nut unit of claim 8, wherein the at least one fitting groove comprises two fitting grooves circumferentially spaced apart from each other and the two fitting grooves form a predetermined angle therebetween.

10. The rivet nut unit of claim 8, wherein the predetermined angle is about 120 degrees.

\* \* \* \* \*